United States Patent [19]

Olmsted

[11] 3,777,074

[45] Dec. 4, 1973

[54] FILE PROTECT SYSTEM FOR MAGNETIC TAPE UNIT WITH DIAPHRAGM OPERATED SWITCH FOR SENSING PRESENCE OR ABSENCE OF WRITE ENABLE RING

[75] Inventor: Dennis R. Olmsted, Westminster, Colo.

[73] Assignee: Storage Technology Corporation, Boulder, Colo.

[22] Filed: July 12, 1972

[21] Appl. No.: 271,172

[52] U.S. Cl. 179/100.2 D, 340/174.1 B, 340/267 R

[51] Int. Cl. ........ G11b 15/04

[58] Field of Search ........ 179/100.2 D; 340/174.1 B, 267 R; 226/91, 92

[56] References Cited

UNITED STATES PATENTS

| | | | |
|---|---|---|---|
| 3,564,155 | 2/1971 | Pendleton | 179/100.2 D |
| 3,641,277 | 2/1972 | Campbell et al. | 179/100.2 D |
| 3,688,300 | 8/1972 | Whysong et al. | 179/100.2 D |
| 3,688,057 | 8/1972 | Lee | 179/100.2 D |
| 3,474,753 | 10/1969 | Weyrich et al. | 179/100.2 D |

*Primary Examiner*—Vincent P. Canney
*Assistant Examiner*—Alfred H. Eddleman
*Attorney*—Richard E. Kurtz

[57] ABSTRACT

A file protect system for a magnetic recording unit includes a diaphragm actuated switch for sensing the presence of the reel ring. A supply port in a conical shaped projection guides air under pressure toward the position occupied by the reel ring. When the ring is not present, the uninterrupted flow of air creates a slight vacuum in a return port. The return port extends through the conical projection and is within and on the same center line as the supply port. Flexible tubing connects the return port to the diaphragm actuated switch. When a reel ring is present in the reel, the flow of air from the supply port is disrupted thereby creating a slight pressure increase in the return port. This pressure operates the diaphragm actuated switch thereby producing a NOT FILE PROTECT or WRITE ENABLE signal which allows the magnetic tape unit to write on the tape.

5 Claims, 1 Drawing Figure

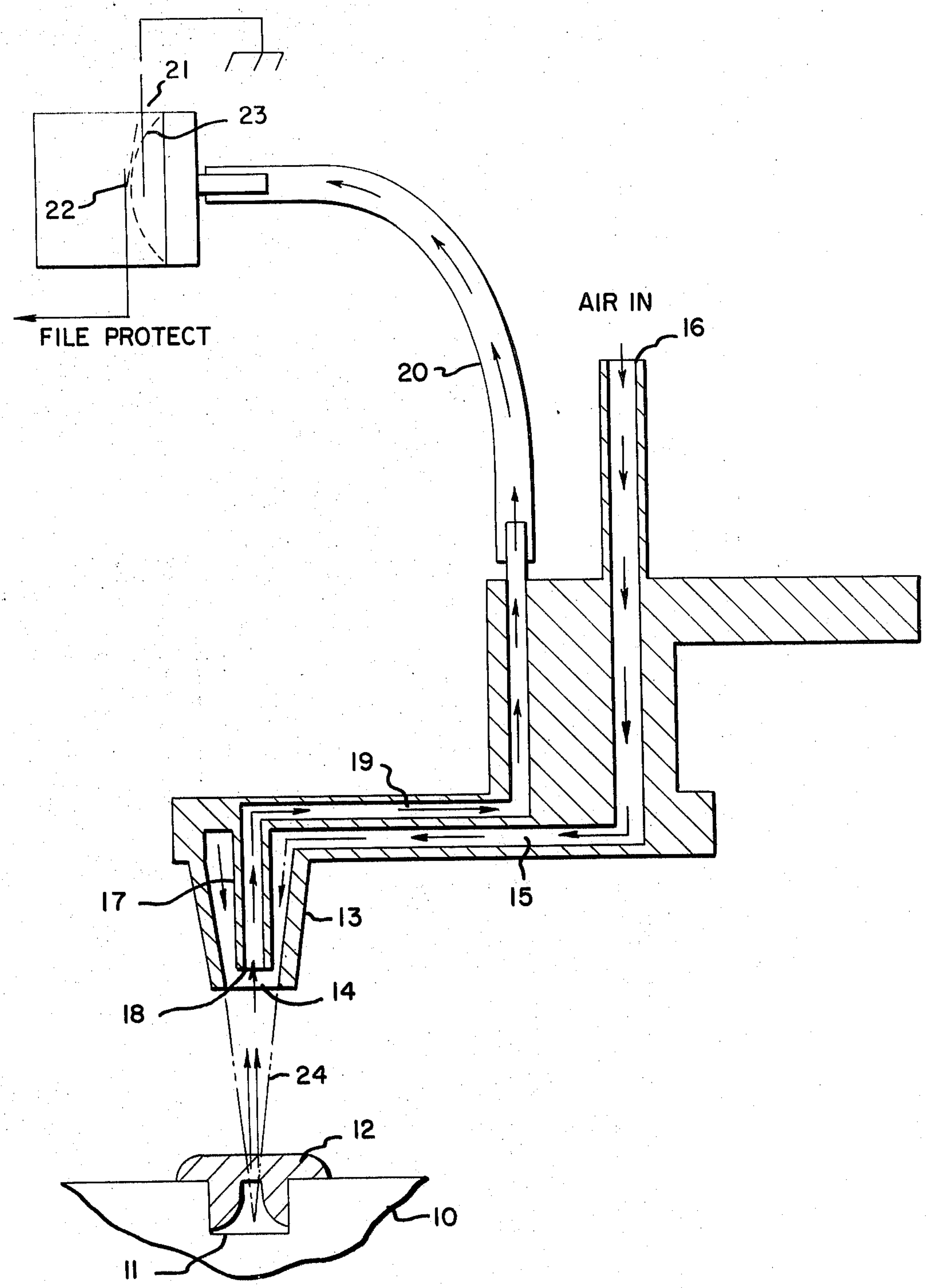
21
23
22
FILE PROTECT
AIR IN
16
20
19
15
17
13
18
14
24
12
10
11

FILE PROTECT SYSTEM FOR MAGNETIC TAPE UNIT WITH DIAPHRAGM OPERATED SWITCH FOR SENSING PRESENCE OR ABSENCE OF WRITE ENABLE RING

BACKGROUND OF THE INVENTION

This invention relates to file protect systems for a magnetic tape recording unit and more particularly to a file protect system using a diaphragm actuated switch to sense the presence or absence of the reel ring.

U.S. Pat. No. 3,641,277 shows a file protect system for a magnetic tape unit. In this system a solenoid driven switch detects the presence or absence of the write enable ring. A switch is mounted on a solenoid plunger. When the solenoid is actuated the switch and switch actuator thrust forward. The switch actuator arm is configured so that in the actuated position it penetrates the area occupied by the write enable ring. If the ring is not present the switch is not actuated. If the ring is present the switch is actuated and write enable logic is set.

Another known file protect system used on IBM 3420 Tape Drives includes a piston, a cylinder, and a pressure switch. The piston is projected into the area occupied by the write enable ring via spring pressure on the rear of the piston. This is the piston's normal mode if a reel is mounted that does not contain a write enable ring. The projected portion of the piston merely rides in the write enable ring groove. If a reel is mounted that contains a write enable ring, the projecting portion of the piston is forced backwards. As the piston travels down the cylinder, a pressure port is uncovered. This air pressure overcomes the spring pressure and the piston is forced to the rear of the cylinder and maintained there as long as the drive is loaded. During the shuttling of the piston, a second port is uncovered. This port is connected to the pressure switch. The pressure in this line actuates the pressure switch which sets the write enable logic.

Proximity detectors are known for use in conveyor operations for counting or machine sequencing. These proximity detectors utilize a shaped air stream and a pressure or vacuum actuated switch to sense the presence of an object.

SUMMARY OF THE INVENTION

In accordance with this invention a diaphragm actuated switch senses the presence or absence of the file protect ring in a magnetic tape unit. When the ring is not present, a projected cone of air emanating from a supply port flows freely into the file protect ring groove. By venturi action this creates a slight vacuum in a return port disposed adjacent to the supply port. The return port is connected to the diaphragm actuated switch so that when vacuum is present the switch remains in its normally opened condition. However, when a file protect ring is present, the projected cone of air is disrupted to create a slight pressure in the return port. This closes the diaphragm actuated switch to produce a signal which enables the magnetic tape unit to write on the magnetic tape.

The prior art devices are mechanically complex and contain moving parts other than the switches. These moving parts are failure-prone due to wear. Failure can result in tape damage due to the sensing mechanism gouging into the write enable ring. Or, failure can result in a false write enable ring detection. This is a critical failure because it may cause a valuable tape to be written upon thereby erasing valuable information recorded on the tape.

The file protect system of this invention has the following advantages over the prior art. The system contains no moving parts except the pressure actuated switch which is a high reliablility device. Only air contacts the write enable ring. This eliminates possible tape or file reel damage due to gouging. The device generates negative to positive pressure differential. If there is a collapsed diaphragm in the switch, the system is "fail-safe" in that it will not write on the magnetic tape. Because of the proximity and inherent rigidity of the device of this invention, badly installed write enable rings are properly seated in the reel groove by the device. In prior art systems, this condition could damage the reel sensing mechanism and could possibly pull the ring out of the file reel to cause machine damage. The present invention provides a system in which the logic circuitry can check to determine switch failure. If the internal porting becomes plugged for example, the device will not generate the feedback signal required to set the write enable logic.

The foregoing and other objects, features and advantages of the invention will be better understood from the following more detailed description and appended claims.

DESCRIPTION OF THE DRAWINGS

The FIGURE shows the file protect system of this invention.

DESCRIPTION OF A PARTICULAR EMBODIMENT

The FIGURE shows a portion 10 of a magnetic tape reel. The reel has a groove 11 around the reel hub. A reel ring 12 is shown in position in the groove. (The reel ring is often referred to as a file protect ring, or a write enable ring).

The file protect device includes a conical shaped projection 13 having a supply port 14 disposed adjacent to the position occupied by the file protect ring. The file protect device is mounted adjacent to the file reel motor. An internal passage 15 guides pressurized air to the supply port from a source.

Within the conical shaped projection 13, and concentric to it, is a tube 17 which terminates in the return port 18. The return port 18 is slightly recessed in the conical projection.

The return port is on the same center line as the supply port, i.e., the same center line as the conical projection. A return passage 19 is connected to flexible tubing 20. This in turn is connected to the diaphragm actuated switch 21. Such switches are commercially available and one such switch suitable for use is the FAIRCHILD PSF 100A. This switch has normally open contacts 22 which are connected to the logic circuitry of the file protect system. A diaphragm 23 actuates the contacts. In the normally open position the logic produces signals which enable the magnetic tape units to operate only in the read mode of operation. That is, a magnetic tape cannot be written upon.

The conical projection 13 shapes the air stream into a projected cone of air 24 having a focal point approximately 0.030 inches inside the groove 11.

Consider first the operation when the write enable ring 12 is not present. In this mode, the conically shaped air stream 24 forms a full cone with a focal point. This air stream has a high undisturbed velocity until it hits the back edge or bottom of the groove 11. When the air stream hits the bottom of the groove, it simply dissipates. The air stream passing over the return port 18 causes a vacuum to be created within the return port due to the venturi effect. This negative differential is directed through the internal porting back to the switch 21. The switch is not actuated as it relies on pressure to activate instead of vacuum. This provides a partial fail-safe condition in that if the switch is failed closed due to a collapsed diaphragm 23, the switch can be deactuated by the vacuum acting against the diaphragm. In this case the sensing logic will not be set and tape writing is disabled.

When the write enable ring 12 is present, the conically shaped air stream 24 is disrupted or prevented from forming a cone-shaped air stream with a focal point. This causes a positive pressure differential to be created in front of return port 18 due to the loss of high speed flow. The positive pressure differential is directed through the internal porting back to the switch 21. Pressure on the diaphragm 23 causes the switch to close. The logic is set and a write mode of operation is enabled.

The device of this invention optimally has a sensing range of 0.000 to 0.120 inches. The invention provides a very reliable file protect ring sensing system.

While a particular embodiment has been shown and described, various modifications are within the scope of this invention. The appended claims are, therefore, intended to cover any such modifications.

What is claimed is:

1. A file protect system for a magnetic recording and reproducing unit of the type in which magnetic heads alter the magnetic state of the magnetic tape only if a reel ring is inserted in the reel of magnetic tape comprising:

an air supply port disposed adjacent to the position of said reel ring, a return port adjacent to said supply port, means for supplying air flowing freely from said supply port to create a vacuum within said return port due to venturi effect, said means causing a pressure increase in said return port when the flow of air for said supply port is disrupted, and a diaphragm actuated electrical switch, said return port being connected to operate said switch to produce a write enable signal with the presence of a reel ring in said reel disrupting the flow of air from said supply port.

2. The file protect system recited in claim 1 wherein said supply port is in a conical shaped projection.

3. The file protect system recited in claim 2 wherein said return port is within said conical shaped projection and is concentric to said supply port.

4. The file protect system recited in claim 3 wherein said return port is recessed in said conical shaped projection.

5. The file protect system recited in claim 1 wherein said return port passes through the conical projection and is on the same center line with said supply port.

* * * * *